T. F. FARMER.
BITS FOR METAL-DRILLS.
No. 171,786. Patented Jan. 4, 1876.
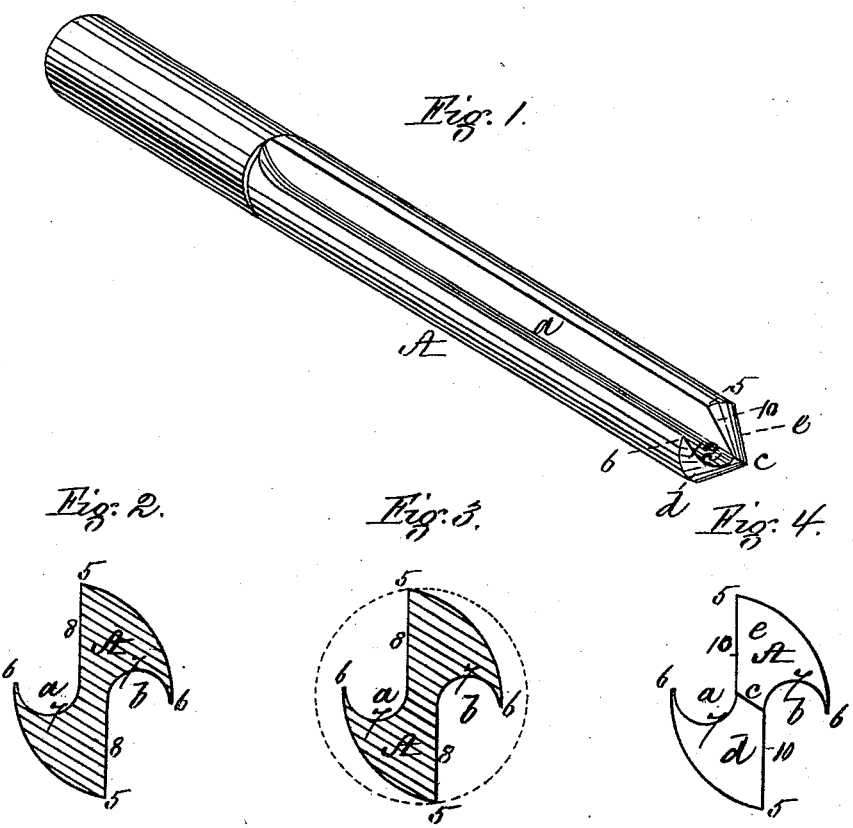

UNITED STATES PATENT OFFICE.

THEODORE P. FARMER, OF BOSTON, MASSACHUSETTS.

IMPROVEMENT IN BITS FOR METAL-DRILLS.

Specification forming part of Letters Patent No. 171,786, dated January 4, 1876; application filed December 9, 1875.

*To all whom it may concern:*

Be it known that I, THEODORE P. FARMER, of Boston, in the county of Suffolk and State of Massachusetts, have invented an Improvement in Drills, of which the following is a full, clear, and exact description, reference being had to the accompanying drawings, making part of this specification, in which—

Figure 1 is a perspective view of my improved drill. Fig. 2 is a transverse section through the same, showing nothing beyond the cutting-plane. Fig. 3 is a transverse section, representing the butt-end dotted; Fig. 4, plan of the point of the drill.

Drills as heretofore constructed, especially fluted drills, are objectionable on account of excessive friction, which renders it difficult to bore a deep hole; and in order to overcome this friction it has been customary to taper the drill in the direction of its length from the point toward the shank or butt-end, the greatest diameter being at the cutting end. The objection to this construction is, that as the drill becomes worn and is ground away the diameter of its cutting end is consequently gradually diminished, rendering it incapable of boring a hole of the same diameter as before.

My invention has for its object to overcome these difficulties; and consists in a drill provided with two symmetrical longitudinal grooves, situated one on each side of a plane passing through the axis of the drill, the depth of the grooves being such that the bottom of one will extend beyond that of the other, and also beyond the center of the drill, each of the opposite sides of the drill being cut away, so as to form a "relief," in order that the cutting-edge only of each groove may come into contact with the side of the hole being bored, whereby the minimum degree of friction is insured, and a free outlet afforded for the discharge of the chips.

To enable others skilled in the art to understand and use my invention, I will proceed to describe the manner in which I have carried it out.

In the said drawings, A represents my improved drill, which is provided with two symmetrical longitudinal grooves, *a b*, formed on its opposite sides, each groove being situated on one side of the center of the drill, and being of such depth that its bottom will extend beyond the center, the grooves passing each other on opposite sides of a longitudinal plane passing through the axis of the drill. After the formation of the grooves *a b* each side of the drill is cut away throughout its entire length from the cutting-edge 5 of one groove to the nearest edge 6 of the other groove, thus forming a relief, and by thus removing the intermediate metal between these points the two cutting-edges 5 5 only come in contact with the side of the hole being bored, whereby the friction is reduced to a minimum. This cutting away of the sides of the drill gives each groove the form shown, the bottom 7 being curved, and the side 8 straight and tangent thereto, the straight sides 8 of the grooves being parallel to each other.

To form the point *c* of the drill the end is ground off on each side at an angle, so as to form the rounded faces *d e*, the straight or cutting edges 10 of which project beyond the curved edges 12, so as to come into contact with and cut the metal to be bored.

It will be seen that the thickness of the metal between the grooves at the center of the drill is less than in the ordinary fluted drill, thus enabling me to produce a point of the exact shape required.

In a drill where the straight sides of the two opposite grooves lie in the same plane with the axis, the chips do not pass freely up the groove; whereas in a drill of my improved construction, where the straight sides 8 of the two opposite grooves are parallel to each other, and situated in planes on opposite sides of the center of the drill, and in which the grooves extend beyond the center, and pass or overlap each other, as shown, the discharge of the chips is continuous and unimpeded, being directly up and out of the grooves, instead of being crowded to one side before passing out, as heretofore.

What I claim as my invention, and desire to secure by Letters Patent, is—

A drill provided with two symmetrical longitudinal grooves, *a b*, situated on opposite sides of, and extending beyond, its center, each of the opposite sides of the drill from 5 to 6 being cut away to form a relief, substantially as and for the purpose described.

Witness my hand this 6th day of December, A. D. 1875.

THEODORE P. FARMER.

In presence of—
   N. W. STEARNS,
   W. J. CAMBRIDGE.